US007383441B2

(12) United States Patent
Vorbrüggen et al.

(10) Patent No.: US 7,383,441 B2
(45) Date of Patent: Jun. 3, 2008

(54) METHOD AND DEVICE FOR CONFIRMING THE AUTHENTICITY OF A DOCUMENT AND A SAFE FOR STORING DATA

(75) Inventors: Jan C. Vorbrüggen, Bochum (DE); Wolfgang Kubbilun, Essen (DE); Eckhard Koch, Essen (DE); Ingo A. Kubbilun, Essen (DE); Hans Joachim Bickenbach, Unna (DE); Marcus Belke, Königswinter (DE)

(73) Assignee: Thomson Licensing, Boulogne-Billancourt (FR)

( * ) Notice: Subject to any disclaimer, the term of this patent is extended or adjusted under 35 U.S.C. 154(b) by 514 days.

(21) Appl. No.: 10/484,606

(22) PCT Filed: Jul. 18, 2002

(86) PCT No.: PCT/DE02/02633

§ 371 (c)(1),
(2), (4) Date: Jan. 20, 2004

(87) PCT Pub. No.: WO03/017641

PCT Pub. Date: Feb. 27, 2003

(65) Prior Publication Data

US 2005/0066172 A1    Mar. 24, 2005

(30) Foreign Application Priority Data

Jul. 20, 2001    (DE)    ............................. 101 34 682

(51) Int. Cl.
G06F 17/60    (2006.01)

(52) U.S. Cl. .................. 713/176; 713/156; 380/51; 358/3.28; 382/232

(58) Field of Classification Search ................ 713/156, 713/176; 380/51; 358/3.28; 382/232
See application file for complete search history.

(56) References Cited

U.S. PATENT DOCUMENTS 4,405,829 A    9/1983    Rivest et al. ............... 178/22.1

(Continued)

FOREIGN PATENT DOCUMENTS

DE    195 21 969 C1    2/1997

(Continued)

OTHER PUBLICATIONS

Chun-Shien Lu et al. "Structural Digital Signature for image Authentication: An Incidental Distortion Resistant Scheme", ACM Multimedia Workshop, ACM 2000, pp. 115-118.*

(Continued)

*Primary Examiner*—Gilberto Barron
*Assistant Examiner*—Farid Homayounmehr
(74) *Attorney, Agent, or Firm*—Joseph J. Laks; Robert D. Shedd; Catherine A. Ferguson

(57) ABSTRACT

The invention relates to a method for confirming the authenticity of a document. According to the invention, said method is carried out in such a way that the authenticity is confirmed using a digital signature, the signed confirmation of authenticity is integrated into the document by means of a secret watermark and that the document is also provided with a public watermark.

24 Claims, 6 Drawing Sheets

U.S. PATENT DOCUMENTS

| | | | |
|---|---|---|---|
| 5,606,609 A * | 2/1997 | Houser et al. | 713/179 |
| 5,721,788 A * | 2/1998 | Powell et al. | 382/100 |
| 5,822,432 A * | 10/1998 | Moskowitz et al. | 380/28 |
| 5,889,868 A * | 3/1999 | Moskowitz et al. | 713/176 |
| 6,141,753 A * | 10/2000 | Zhao et al. | 713/176 |
| 6,233,684 B1 * | 5/2001 | Stefik et al. | 713/176 |
| 6,243,480 B1 | 6/2001 | Zhao et al. | 382/100 |
| 6,359,985 B1 | 3/2002 | Koch et al. | 380/54 |
| 6,748,533 B1 * | 6/2004 | Wu et al. | 713/176 |
| 7,152,047 B1 * | 12/2006 | Nagel | 705/76 |
| 2002/0129255 A1 * | 9/2002 | Tsuchiyama et al. | 713/176 |
| 2002/0150241 A1 * | 10/2002 | Scheidt et al. | 380/44 |
| 2006/0193492 A1 * | 8/2006 | Kuzmich et al. | 382/100 |

FOREIGN PATENT DOCUMENTS

| | | |
|---|---|---|
| DE | 198 47 943 A1 | 4/2000 |
| EP | 879 535 B1 | 9/2000 |
| WO | WO 99/17536 | 4/1999 |
| WO | WO 99/57885 | 11/1999 |
| WO | WO 00/07356 | 2/2000 |
| WO | WO 00/43856 | 7/2000 |

OTHER PUBLICATIONS

Wang et al, A public key Watermark for Image Verification and authentiocation, IEE 1998.*

"Whose Copyright is it, and Who Can Use it—Legally? Watermarks are Beginning to Help Confirm Copyrights, Authentic Ownership, Fingerprints, and Data Integrity", Memon et al., Communications of the ACM, vol. 41, No. 7, Jul. 1990, pp. 35-43.

"A Digital Watermark", Schyndel et al., IEEE International Conference on Image Processing, vol. II, 1994, 3 pages.

"Bildergeschichten", Rink, CT Magazin für Computertechnik [magazine for computer technology], Published by Heinz Heise GmbH, Aug. 1, 1997, pp. 162-175.

"Effective and Ineffective Digital Watermarks", Mintzer et al., Proceedings to the International Conference on Image Processing, Oct. 26-29, 1997, 4 pages.

"A Watermark for Image Integrity and Ownership Verification", Wong, IS&T PICS Conference, 1998, pp. 374-379.

"Publicly Detectable Techniques for the Protection of Virtual Components", Qu, IEEE Xplore, 2001, pp. 474-479.

International Search Report in PCT/DE02/02633 dated Nov. 7, 2002.

* cited by examiner

METHOD AND DEVICE FOR CONFIRMING THE AUTHENTICITY OF A DOCUMENT AND A SAFE FOR STORING DATA

This is the U.S. national phase of International Application No. PCT/DE02/02633 filed Jul. 18, 2002, the entire disclosure of which is incorporated herein by reference.

BACKGROUND OF THE INVENTION

1. Field of the Invention

The invention relates to a method for confirming the authenticity of a document.

The invention also relates to a device that is suitable for carrying out the method.

2. Related Technology

A prior-art method for generating digital signatures is offered by Deutsche Post AG under the trade designation Signtrust.

U.S. Pat. No. 4,405,829 discloses a method of asymmetrical cryptography. This known method serves for encrypting and digitally signing and thus confirming the authenticity and integrity of the digital document using a key pair. The asymmetry of the cryptographic method is achieved here by means of a primary factorization problem.

Moreover, it is a known procedure to use elliptical curves for the asymmetrical cryptography.

Furthermore, by using trust centers or a certificate authority, it is a known procedure to unambiguously associate a specific public key with a natural or legal person.

Moreover, standards exist regarding the association of the key and the execution of the method. Known standards are ISO/IEC IS X.509 and PKCS # 11.

Furthermore, methods for generating a secure hash value or a message digest are known. Here, a representative value is determined from a document or from parts of the document, said value serving as evidence of the authenticity of the document.

Moreover, it is a known procedure to integrate identification information into digital watermarks. This integration is done in such a way that the information can only be reconstructed with a key and it is otherwise imperceptible.

The article by S. Katzenbeisser and F. A. P. Petitcolas titled "Information Hiding Techniques for Steganography and Digital Watermarking," Artech House, Norwood, Massachusetts, U.S.A., 2000, describes the linking of additional information, which is also referred to as metadata. The metadata, which is imperceptible without using auxiliary means, is inseparably linked to a digital document.

German Patent DE 195 219 69 C1 and European Patent EP 0 879 535 B1 describe a method for marking binarily encoded data records. Here, a data record to be marked is broken down into blocks of pixels, whereby the pixels are transformed from the configuration space to the frequency space by means of a transformation function. Furthermore, there is a discrete position sequence for the implementation of information units in the data records to be marked, taking into account a key as well as data-specific properties. The information unit to be implemented is written at the positions in the data record specified by the position sequence. As a result, the digital watermark is able to hold any binarily encoded information of variable length and to insert it into the document in a robust and forgery-proof manner.

International patent application publication WO 99/57885 and U.S. Pat. No. 6,243,480 describe a method for the digital confirmation of the authenticity of analog documents. With this method, the digital watermark that is embedded in the document serves as a carrier of authentication information. The displayed digital watermark survives media discontinuities. Moreover, this method discloses the use of a hash value as an authentication value.

German Preliminary Published Application DE 198 47 943 A1 describes a method for generating digital watermarks for electronic documents, whereby the genuine authorship of the documents is confirmed on the basis of digital watermarks. Here, in order to improve the possibility of identity confirmation, the watermark is provided with a hash value of the document.

Another known method for inserting a digital watermark is described in the article by R. G. van Schyndel, A. Z. Tirkel, C. F. Osborne titled "A Digital Watermark," first IEEE International Conference on Image Processing, Vol. II, pp. 86-90. Austin, Tex., U.S.A., 1994. This method calls for the insertion of a digital watermark into an image in that the lowest-value bit of a pixel is changed and thus only minimal changes are inserted into the image. However, this known method has the drawback that the watermark can no longer be detected once the image has been manipulated or converted.

Here, it is especially important to apply the watermark in such a way that it is not destroyed through the manipulation or formatting of the document. A known procedure for solving this problem is to store information in the frequency space.

Fundamentally, however, other methods are also suitable for applying manipulation-proof watermarks, which are also known by the designation robust watermarks.

Moreover, methods are known that use machine-readable encoding to achieve the authentication of documents.

These methods use machine-readable bar codes and increase the forgery-proof character of certain documents, especially banknotes, checks, identification cards and lottery tickets. Such methods are described, for example, in international patent application publication WO 0007356.

SUMMARY OF THE INVENTION

The invention is based on the objective of further refining a method of the generic type for confirming the authenticity of data in such a way that the authenticity is confirmed as reliably as possible.

According to the invention, this objective is achieved in that the authenticity is confirmed with a digital signature in that the signed confirmation of the authenticity is inserted into the document by means of a secret watermark and/or into a graphic representation confirming the authenticity the document, and in that the document is additionally marked with a public watermark.

The invention preferably provides for the use of a visible graphic representation and of a visible watermark, preferably a seal, as the carrier of an invisible watermark.

The information is encrypted with a suitable key.

The term "document" is to be understood in the broadest sense of the word. It encompasses any data records, especially data records that can be digested. In particular, the term "document" in the invention has the meaning of a unit including one or more data records and it includes audio and video recordings.

In addition to official documentation, further important examples of such documents are audio or video representations, including multimedia works.

The invention makes it possible to produce documents that combine the advantages of analog documents with the advantages of digital documents.

In particular, the invention comprises generating documents that have a familiar appearance to a user, thus instilling a high level of trust among users. In this manner, the plausibility and obviousness can be checked without auxiliary technical means, for example, the initial inspection of an identification document by a security guard. Moreover, the documents can be processed, for example, printed out on media, or transported. Furthermore, they can be read without using auxiliary technical means. Besides, various levels of protection can be instituted, for example, graduated according to standard texts, written contracts and contracts that have been certified by a notary. Moreover, the documents are easy to produce and to handle.

The documents according to the invention also entail the advantages of digital documents such as easy and reliable authentication. Moreover, the integrity protection is secure and simple. Certified copies can be generated quickly, easily and with simple technical means. This applies to the sending of the document as well. Furthermore, the documents can be archived quickly, simply and in multiple places at the same time.

Moreover, the invention avoids the known drawbacks of analog documents and of digital documents.

For example, in order to check the integrity, document-external information is needed, for example, about the format, paper quality, seal image. Furthermore, the checking can be carried out without special knowledge, skills or specialized equipment such as UV lamps.

Further advantages of the invention are the fact that the digital signature can be displayed visually so that the signer also receives confirmation that the signature has been applied. Moreover, a verifiable print-out can be produced. The invention makes it possible to render the digital signature visible in the digital as well as in the analog form of a text document. Besides, an inseparable linking of the text document with the digital signature is achieved in the digital as well as in the analog form of a text document.

Furthermore, it becomes possible for the analog form of a document that was originally present in digital form to be given the same legal validity and evidentiary force as the digital, signed form of the same document. This means that it is possible to use the digital and analog form of the document interchangeably, thereby ensuring the same degree of authenticity and integrity.

Moreover, the invention makes it possible to convert a document that is present in analog form such as, for example, a certificate, a contract text or an official notice, into digital form while retaining its legal status or its security standard, thereby providing the advantages of digital documents.

Furthermore, in this manner, the comprehensive integrity protection and the authentication guarantee of the digital signature are extended to documents that can be obtained in analog form.

In order to increase the security of the confirmation of the authenticity, it is advantageous to acquire information that is characteristic of the document and to generate the secret watermark in such a way that it contains the information or a part thereof.

In this context, the method is advantageously carried out in such a way that the information contains a hash value.

Moreover, a legalization of the specific signature is possible. The function of legalization is advantageously achieved in that the signature is legalized.

In a first advantageous embodiment of this variant, the legalization is carried out in that the signed document is once again digitally over-signed by an entity authorized to perform legalization.

As an alternative or else additionally, it is advantageous for the execution of the confirmation of the authenticity to be stored in a separate file.

Preferably, this embodiment is refined in such a way that the file and/or the certified data is transmitted to a trust center.

Using the method according to the invention, various forms of confirmation of the authenticity of documents are possible. For example, an issuer of a document can confirm the authenticity with his/her own signature.

Especially preferred embodiments of the invention relate to the certification of the data, whereby the authenticity of the data is certified in a special form. For this purpose, it is advantageous to carry out the method in such a way that the trust center checks whether the digital signature belongs to a person who is authorized to confirm the authenticity of documents.

Advantageously, this method is carried out in such a way that a checking procedure is performed to ascertain whether the particulars of the person are stored in a register.

Advantageously, the method is carried out in such a way that the trust center issues a confirmation that the owner of the signature is authorized to confirm the authenticity of documents.

Such a confirmation can be effected in various ways. For example, the trust center verifies that the authenticity has been confirmed by a verification center that was entered in a list of verification centers that are authorized to do so.

In order to increase the evidentiary force of the authenticity of the data, it is advantageous for the confirmation of the authorization of the signing entity that certifies documents to be confirmed by the trust center with a digital signature, for example, by means of a certificate.

Especially advantageous embodiments of the method are characterized in that they use a key to insert the watermark into the document and to read it out; in this sense, it is similar to the typical symmetrical encryption method. When used, this key—hereinafter also called watermark key for the sake of clarity—has to be distinguished from the key pair that is used for signing or encrypting the message contained in the watermark, and for which all possibilities of an encryption system with public keys can be used.

It is a known procedure to use digital watermarks in order to prevent the fraudulent production of copies of a document. Here, the owner inserts a watermark into a document containing an annotation referring to him/her. In a known variant of this method, when the document is transmitted to a customer, another customer-specific watermark is inserted into the document.

Preferably, the signature is inserted into the data by means of one of the previously generated watermarks and/or as a component of another watermark.

The function of the trust center can be realized in various ways. For example, a trust center can be used of the type operated, for example, in Germany by Deutsche Post AG.

The trust center can carry out confirmation or verification tasks for the confirmer of the authenticity of the data as well as for other centers.

For example, the trust center can be used to provide legalizations. A legalization confirms that the certifier is authorized to provide certifications.

In an especially preferred embodiment, the authorization to provide legalizations is contained in certificate attributes.

Whereas the known legalizations are non-technical methods in which a manual checking procedure is carried out to ascertain whether a verification center is authorized to certify documents, this preferred embodiment of the method according to the invention is a technical method since it can be carried out fully automatically, without human intervention.

The generation of another watermark for purposes of the legalization of the documents allows fully automated authenticity confirmations. The authenticity confirmations are each issued in the legally applicable form, whereby, for example, if the laws change, at most only slight changes are needed in the trust centers. For example, the generated additional watermarks can have the function of apostilles. For instance, the president of a competent court confirms that the verification center is authorized to certify data.

The documents can be, for example, documents produced by multimedia such as video clips. Here, too, a check of the producer and of the integrity is advantageous. The authentication as well as the integrity check are central areas of application of an encryption system with public keys. A digital watermark can serve as an instrument for the requisite signature with the additional properties that it cannot be separated from the document and that it can be designed in such a way as to survive a media discontinuity.

The data security is further increased in that the digital signature is inserted into the data as another watermark.

Moreover, it is advantageous for the secret watermark to contain metainformation. The security features employed can be advantageously augmented in that the public watermark is embedded in a graphic symbol, whereby the graphic symbol recognizably confirms the authenticity of the document, and thereby the graphic symbol can hold as much information as the watermark can hold security-relevant information.

In order to further increase the security of the verifications, it is advantageous that, before the document is additionally marked with the public watermark, a checking procedure is performed to ascertain whether the public watermark can hold a sufficient amount of security information.

In order to more easily be able to prove the authorship of the document, it is advantageous for the point in time of the confirmation of the authenticity of the data to be recorded.

Advantageously, the method is carried out in such a way that the point in time is inserted into the secret watermark.

In order to be able to substantiate the point in time even more simply and reliably, it is advantageous for the point in time to be certified by a digital time stamp.

An especially secure and reliable substantiation of the point in time of the certification is achieved in that a trust center generates a secure time stamp. Preferably, the time stamp is digitally signed.

Individual advantageous steps for confirming the authenticity of the data will be shown below. A combination of the individual steps shown is especially advantageous albeit not necessary.

The watermark should be different for each document—for example, in that it is derived from the content of the document—but it has to be publicly accessible, for instance, via a registration service based on an encryption system with public keys. Thus, the watermark is no longer robust against attempts to remove it.

The inserted messages correspond to those of a commonly employed digital signature, but for capacity reasons, can be used in abbreviated form.

The messages are encrypted with the private key of the author.

The watermark can be read out and the messages can be decrypted by any third party that has access to the requisite keys (watermark key and appertaining public key).

Moreover, it is advantageous to insert additional information (metainformation) into the watermark and to transmit it.

The services of a trust center, especially in conjunction with asymmetrical cryptography with digital watermarks, open up a broad application range. Thus, one can speak of a reciprocal catalyst function when it comes to the broadening of the applications and greater acceptance on the part of the users.

In addition to the confirmation function that the trust center has, it also offers further services, for example, the infrastructure of an encryption system with public keys and special services such as, for instance, signing, encrypting, decrypting as well as confirming times of day and other time data (time stamp service).

The digital watermark—viewed in isolation—establishes a relationship to the person or entity that has embedded a watermark. Through the identity check and the associated issuing of certificates by the trust center, digital watermarks are very well suited for linking to an identity.

Fundamentally, private, public and partially public digital watermarks co-exist. After the embedding, the first category can only be made visible again by the person who carried out the original embedding. The type of embedding is determined by a secret password, preferably a symmetrical key.

If the secret password is justifiably passed on to third parties (selectively), a secure communication channel is needed. This can be created by using asymmetrical cryptography—comparable to the sending of confidential e-mails.

The services provided by the trust center via the SEA card such as digital signing and asymmetrical encryption and decryption open up excellent possibilities on two levels for using the digital watermark as a vehicle for information whose confidentiality and integrity are ensured.

First of all, the data to be embedded can be encrypted and/or signed. Secondly, the cryptographic methods serve for the reliable exchange of symmetrical keys and, for example, also for the proof of authorship (known as "IPR"=intellectual property rights) of a digital work through the involvement of digital signatures of the digital medium concerned.

The time stamp service of the trust center is only used in procedures for preserving evidence: if, for example, a digital work is to be registered at Signtrust, then the point in time of receipt at Signtrust has to be recorded in order to impart the registration with a legally binding status.

The digital watermark fulfills one or more of the following features:
1. marking of different types of media,
2. inseparability of the embedded data and the medium,
3. overcoming of media discontinuities (e.g. during printing and scanning),
4. invisibility of the embedded information.

In general, digital media entail the problem that the digital data volume and the appertaining digital signature can be separated at any time. The following example illustrates how this undesired side effect can be eliminated.

The author of a PDF document, for example, would like to secure the integrity of the document. The document contains at least one graphic representation or a logo. The author can now digitally sign the contained text and can embed the signature as a digital watermark in an image of the document. Through the (textual) identity of the author contained in the document, his/her certificate can be requested from Signtrust and the integrity can be verified.

Overcoming media discontinuities also makes it possible to retain embedded information on analog media (paper, magnetic tapes, video cassettes).

The invisibility of the embedded information fulfills the requirement that the visual perception of the digital object by a human viewer should not be impaired. Moreover, the invisibility enhances the security.

The transformation of the digital signature into a digital watermark creates a watermark that attains a high level of reliability through the use of the services of a trust center. Consequently, from the standpoint of the technology of digital watermarks, new applications for watermarks can be constructed that have a legally binding status. The contrary viewpoint leads to an expansion of the existing services of the trust center as well as to the development of new trust center services.

A digital signer, for example, when using an e-mail plug-in, acquires an additional function through the possibility of embedding digital watermarks when sending e-mail attachments that need to be protected.

Trusted digital watermarking clears the way for further areas of application. In particular, the property that the watermark has of overcoming media discontinuities is an especially important factor. Particularly relevant application instances are those in which authenticated documents are needed in paper form. The authentication here is given legal status through a digital signature.

Further synergy effects of the trust center and of the generation of watermarks lie in the use of the encryption systems with public keys for the reliable exchange of symmetrical keys of private digital watermarks as well as in the establishment of trust for embedded data.

The invention simplifies certification procedures. Moreover, the method according to the invention makes it possible to confirm the authenticity of a document just one single time and to use the confirmation of the authenticity as often as desired. A digitally certified document can thus be passed on to any number of persons, customers, etc.

The involvement of a time stamp service in the embedding of digital watermarks or in the registration of digitally marked data is another advantage. Especially with respect to IPR services such as, for example, the registration of digitally marked material for preservation of evidence in the eventuality of legal disputes, the application of a time stamp is mandatory.

Another subject matter of the invention is an electronic safe for holding digital documents, which is characterized in that it allows write access only for those documents that have a digital signature contained in a digital watermark.

This electronic safe is especially well-suited to hold the electronic documents processed according to the invention.

The invention also relates to electronic documents that are characterized in that they contain a secret watermark and a public watermark.

Here, it is especially advantageous for the secret watermark to be inserted into the public watermark.

Such documents are preferably produced with the process steps presented here.

BRIEF DESCRIPTION OF THE DRAWINGS

Additional advantages, special features and practical refinements of the invention ensue from the subclaims and from the presentation below of preferred embodiments that make reference to the drawings.

The drawings show the following.

DETAILED DESCRIPTION

Figure 1:
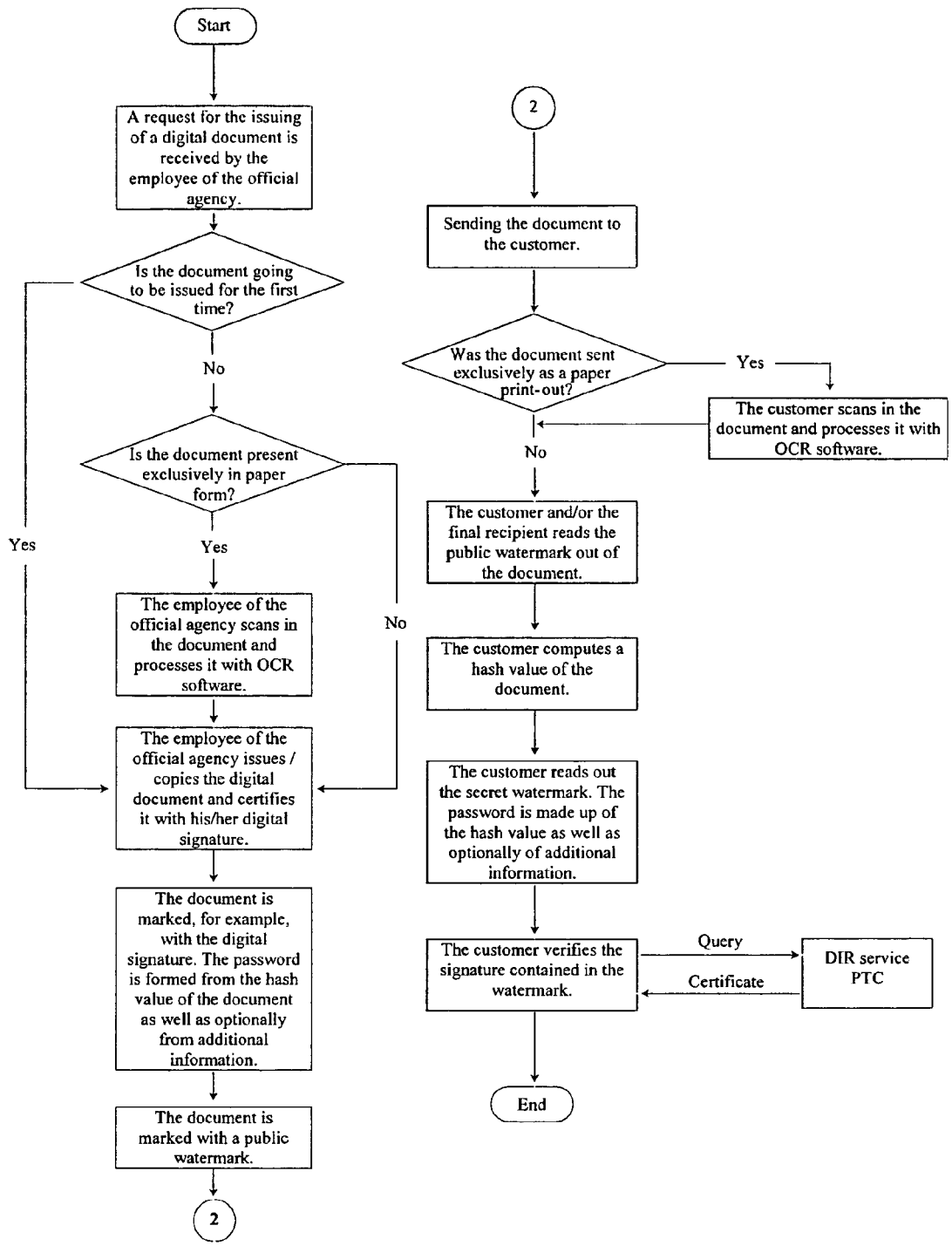
FIG. 1—a schematic diagram of a method according to the invention for issuing digital documents.

The figures presented show preferred embodiments of a multi-stage method comprising several steps, preferably the generation of a document, its digital signing, the insertion of the digital signature into a digital watermark, the integration of the digital watermark into a document, the retrieval of the digital watermark and the verification of the document on the basis of the decrypted digital signature.

An especially preferred embodiment of this method comprises the following steps:

Signing:
1. A digital document to be protected is digitally signed.
2. The digital signature (in the form of the encrypted message digest) is inserted as a digital watermark into a suitable graphic representation.
3. The graphic representation provided with the digital watermark is integrated into the document.
4. The digital document is printed out.

Verification:
5. The print medium is digitized.
6. The original text is recovered from the digitized print medium (for example, by means of optical character recognition [OCR]).
7. The message digest is computed from the recovered original text.
8. The graphic representation is extracted from the digitized print medium and the digital watermark is recovered.
9. The digital watermark is decrypted by means of the public key of the signer.
10. The comparison of the values obtained in 7. and 9. determines the outcome of the verification.

The combination of the insertion of the secret watermark into the document and/or into a graphic representation that confirms the authenticity of the document in combination with the marking of the document with a public watermark means that the method for issuing or checking the document is carried out especially securely and reliably.

The invention makes it possible to produce documents that combine the advantages of digital and analog documents. The produced documents can be obtained from digital documents as well as from analog documents.

Examples of documents present in digital form are texts (in any format, for example, ASCII text, formats of a word processing program such as Microsoft WORD), components of a table, video or audio data or else computer programs.

Examples of the analog initial form of the documents are text print-outs, existing certificates and contract texts and official notices. These are first digitized before the processing, and preferably, the correspondence of the content of the original document to its digitized form is certified by an entity that is authorized to do so.

The digital watermark can be inserted in different ways into the graphic representation that bears it.

In this context, the graphic representation can have different forms, for example, it can correspond to a traditional seal, or it can form the background of a text document or the structured or unstructured edging of a text. Moreover, it is possible to insert the graphic representation in several individual graphic representations at different places in the document.

In addition, it is possible to visibly insert the name of the signer or the name of the trust center or information from the certificate such as, for example, its serial number or any desired combination of this information. The visible representation can either be directly readable, for instance, in written form in a print-out or else in machine-readable form, for example, in a bar code.

The analog form can be determined from the produced document in a wide variety of ways. Any printing modality and any display modality are suitable for this purpose.

Examples of the printing modality are methods to print on paper or on objects such as textiles, wood, carpeting, metal and walls.

The display is effectuated via an analog or digital interface, for example, on a television screen or computer monitor, on an LCD display or on a display panel.

The text can likewise be recovered in various ways, for example, by means of a scanner, a digital camera, a digital camcorder or a WebCam.

The integration of additional functions increases the security and reliability of the method and of the documents produced or checked with the method.

For example, by including a time stamp service of a trust center, the point in time of the generation of a document or of the conclusion of a contract can be documented.

Furthermore, it is possible to attain different security levels.

The various security levels can be achieved, for example, by a different granularity of the verification elements. In a first embodiment, a verification element, for example, is situated in the document. A higher security level can be achieved, for example, in that each page of a text document contains a verification element. In an even higher security level, it is advantageous for each semantic element, for example, each paragraph of a contract or each field of a blank check to contain a verification element.

The certificate information can be present in visible or invisible form. Moreover, it is possible to insert the certificate information into the document as an additional watermark. The additional insertion of a message digest into the watermark is likewise advantageous.

It is especially advantageous to insert the certification information as well as the message digest into the watermark.

The message digest is a cryptographic hash total that serves to ensure the authenticity of the document or of the watermark or of a component contained in the document or in the document. Although cryptographic hash functions are preferred embodiments for determining the cryptographic hash totals, the message digest is not limited to hash functions but rather it comprises every cryptographic hash total, irrespective of the algorithms used to generate or decrypt it.

In the digital world, the function of an official seal can be fulfilled by a digital signature. However, after the media discontinuity, the seal as well as the digital signature lose their function and effectiveness: the stamp at the end of a paper document can no longer vouch for the authenticity of the document and conversely, the bit sequence of a digital signature loses its function once the appertaining document has been printed out.

Through the digital watermark and its combination with the digital signature, the problem of media discontinuity is overcome. At the time of the transition from the digital into the paper-bound world and vice versa, the watermark takes on the function of an authenticity seal. If a document that has been provided with a digital watermark is printed out and subsequently scanned in again, then the watermark and the authenticity information contained therein are still detectable.

Through the invention, it is possible for the first time to ensure the authenticity of documents in automated business transactions, even after media discontinuity, that is to say, continuously. In addition to the aspect of enhanced security, this offers trust center customers an enormous additional benefit in the form of a potential for increased efficiency, streamlining and cost cutting in executing their automated business transactions. Moreover, the private customers and users of such services have the confidence and the advantages of the paper-bound version of a document without having to dispense with the advantages of the digital version.

The use of the invention is especially advantageous with those applications in which the authenticity of declarations of intent and of documents is to be ensured. This includes, for example, the realm of public administration.

The term e-government stands for the use of network-based technologies within an official agency, in exchanging information with other authorities and with the users of public services (private customers or company customers) with the objective of communicating or exchanging services. This refers especially to the use of data communication networks such as the Internet, Extranet, Intranet as well as Electronic Data Interchange (EDI).

The invention allows an optimization of business processes, an improvement of the internal and external cooperation and an enhanced orientation of the administration vis-à-vis the general public.

Preferred areas of application for the trusted digital watermark approach can be found wherever the general public, companies and institutions wish to receive official documents from an official agency, to sign applications or to submit records and documents.

The invention provides the prerequisites for continuous e-government processes.

For example, through the use of the invention, documents such as certified copies of birth certificates or entries in the land register can be requested securely and reliably. Preferably, a holistic system is implemented in which individual persons receive utilization rights by registering. Preferred physical means for executing the digital signature are card readers, signature cards and encrypting software as well as watermark marking software.

For instance, a member of the general public sends a signed e-mail with a request to an official agency. The official agency processes the request as an application and transmits, for example, via e-mail, the documents that have been signed and provided with a digital watermark. The documents can then be forwarded electronically as well as printed out. Thanks to the digital watermarks, each of these is an original since the watermark can serve as an official seal. Copies can be made by reproducing the printouts as well as by reproducing the data, or else by transmitting them again.

The reverse route, namely, that a member of the general public transmits documents in digital and signed form to an official agency, is likewise an integral part of preferred embodiments of the invention. Here, the documents to be signed and transmitted can be present in digital form and subsequently signed and they can also first be present, for example, in paper form and then converted into digital documents by scanning.

The documents certified according to the invention can be used in a complex holistic system. For example, a processing procedure starts with an electronic application, an electronic internal instruction or on the basis of an electronically monitored event such as the speed violation of a vehicle driver.

In this process, preferably at least one digital text document is generated. The digital text document is certified by the customer with his/her digital signature and subsequently marked with the signature. The password for the marking is formed from the hash value of the document. Then another marking is made with a public watermark that contains information on the "issuing customer", on the "employee in charge", on the "type of document", on the "date" and on the "trust center".

The digital document can be sent to the applicant either encrypted and digitally signed via e-mail, diskette or in paper form by mail. Sending the document in paper form has the drawback for the applicant that he/she likewise has to scan and re-process it.

The customer of the official agency reads out the public and secret watermarks and checks the authenticity and integrity of the document by submitting a query to the trust center.

A schematic diagram of a preferred method for issuing digital documents is shown in FIG. 1. Terms used in the schematic diagram are to be understood in their broadest sense. In particular, where persons are indicated, it is also possible to have a special computer or a special software routine instead of the person.

For example, software agents can be used. Software agents, which are also referred to as intelligent agents, are preferably made up of software units that monitor their environment and act automatically. In the case described, one software agent acts on behalf of the official agency and another software agent acts on behalf of the customer of the official agency.

Preferred method steps are presented below with reference to FIG. 1.

The processing procedure shown in FIG. 1 starts with the arrival of a request for a digital document to be issued at the server of an official agency.

On the basis of the request, the server checks whether this is a document that is going to be issued for the first time.

If the document is going to be issued for the first time, the software process working for the employee of the official agency generates or copies the digital document. The employee of the official agency certifies the document with his/her digital signature.

If the document has already been issued, then it is first checked whether the document is exclusively present in paper form. If the document is exclusively present in paper form, then it is scanned in and processed with optical character recognition software (OCR). The document thus generated is likewise certified with a digital signature and subsequently marked with a public watermark and sent to the customer who had requested it.

The processing of the document at the customer is done as a function of whether the document was sent exclusively as a paper print-out or else in digital form.

If the document was sent exclusively as a paper print-out, then the document is scanned in and processed with OCR software.

The public watermark is read out from the document that was transmitted in digital form or that was subsequently converted into digital form.

Subsequently, the hash value is determined. Then the secret watermark is read out.

Subsequently, the customer verifies the signature contained in the watermark. The verification is preferably carried out by an especially automated query to a trust center PTC. The trust center makes it possible to check the digital signature contained in the watermark, preferably in that, in a secure manner, it provides information about the status of the certificate at the point in time when the signature was generated.

Figure 2:
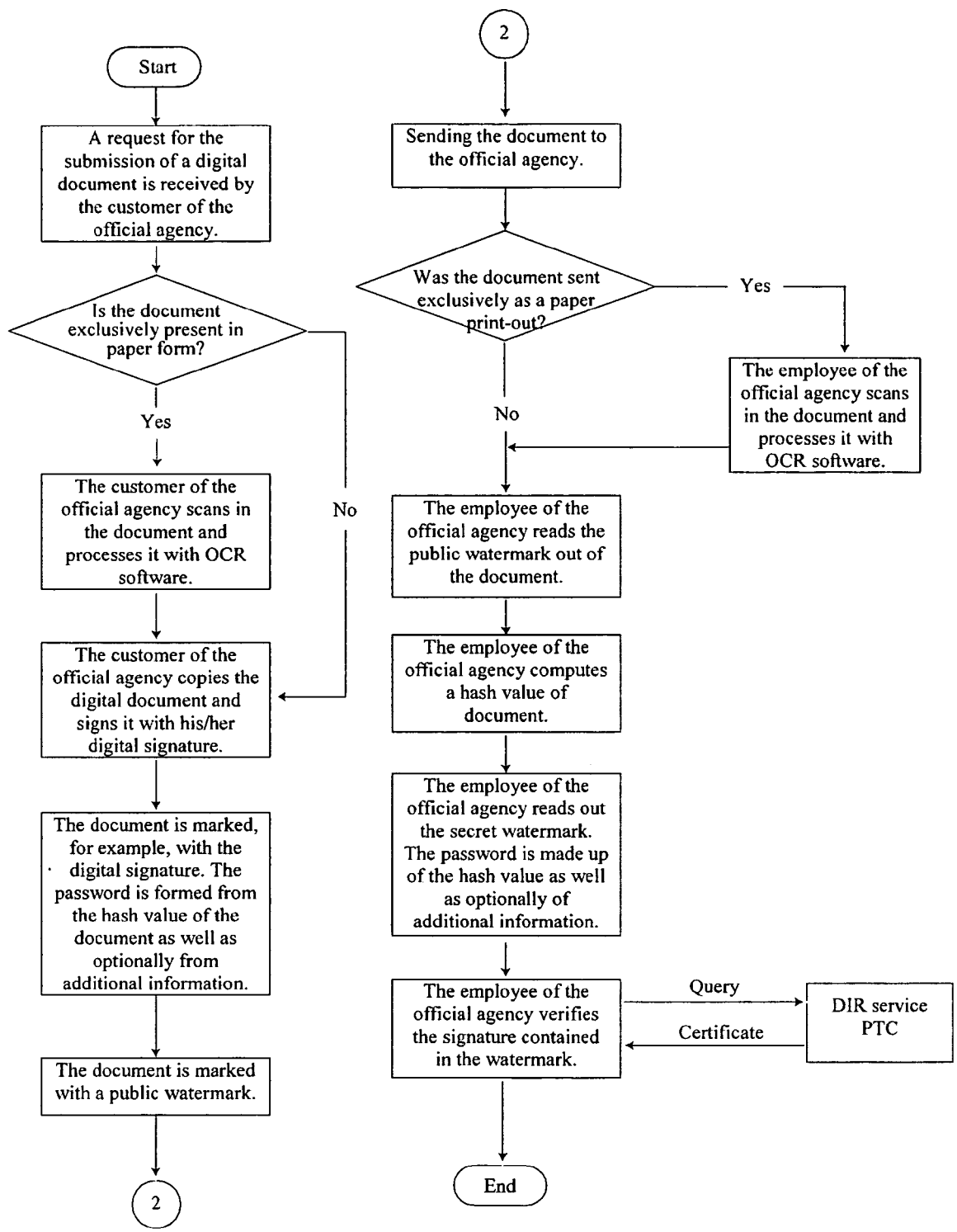
FIG. 2—a schematic diagram of the submission of digital documents.

Another embodiment of the invention is presented below with reference to FIG. 2.

Here, preferably the same process steps are used as those presented with reference to FIG. 1.

However, these are documents that are to be generated by the customer of the official agency. For example, a member of the general public can generate his/her tax return electronically, provide it with a digital signature and subsequently forward it to the competent revenue office.

The process steps used in this or similar procedures are explained in greater detail below with reference to FIG. 2.

Here, the processing procedure starts in that an official agency instructs a customer to submit a digital document. In a fully automated administration process, this can be done automatically. For example, in an automated procedure, revenue offices can send requests by e-mail to individual members of the general public regarding the generation of tax returns. Public bids such as, for example, the presentation of a call for bids on the Internet, likewise constitute such requests.

However, it is not necessary for the official agency to first issue a request. Through familiar prior use, for example, it is known that patent applications can be transmitted to individual patent offices in encrypted form. However, the invention allows a far greater security against manipulation of the filed application texts.

A digital document present at the customer of the official agency is copied and signed with the digital signature.

Documents that were not previously in digital form are first digitized.

After the document has been provided with the digital signature, the document is marked with a public watermark and subsequently sent to the official agency, whereby it can, of course, also be sent via an unsecured route such as, for example, as an e-mail.

Sending as a paper document is likewise possible, although preference is given to sending in exclusively electronic form since here the step of scanning in the document can be skipped.

In a subsequent processing step, the computer of the employee of the official agency reads out the public watermark from the document.

The computer of the employee of the official agency computes a hash value from the document.

The computer of the employee of the official agency also reads out the secret watermark.

Subsequently, the employee of the official agency verifies the signature contained in the watermark. The verification is preferably carried out by submitting a request to a trust center. Thus, a verification of the authenticity of the document is provided.

The previously presented checking of the authenticity of documents can be used equally in the business or private sector, for example, in order to secure the placing of orders or to be able to attach the digitally signed certificates to correspondence, for instance, digitally signed educational certificates to job applications.

The procedure of confirmation of the authenticity is used so as to be able to guarantee the correspondence of a copy to the appertaining original document. Such a digital method can be constructed through the combined use of digital watermarks and the services of a trust center that is in compliance with the signature laws. Here, the authenticity is not confirmed in the traditional manner by a physical marking such as, for example, a stamp or a seal, but rather by a suitable marking of a document.

In addition to the marking, a certified document is provided with a small graphic representation, for example, an emblem of the issuer. Information such as the name of the issuer, date, etc. can be applied to this graphic representation in plain text for purposes of rendering the confirmation of the authenticity visible. Moreover, the graphic representation serves as the carrier of the digital watermarks involved in the workflow.

An advantage of such a confirmation of the authenticity service consists in the fact that, once a document has been certified, it can be copied as often as desired, whereby the correspondence with the original can be proven for every single copy. In addition to the trust center as a reliable instance, a certification center that confirms the authenticity is involved in the workflow.

Possible parties involved in an authenticity confirmation are compiled in the following table, which serves as an example.

| Acting party | Abbreviation | Remark |
| --- | --- | --- |
| Trust center | PTC | Reliable entity that provides the encryption system needed for confirming the authenticity with public keys |
| Verification center | — | Verification center (for example, a notary) that carries out the confirmation of the authenticity |
| Customer | — | Party ordering the confirmation of the authenticity |
| Recipient | — | Recipient of a certified copy |

The sequence presented preferably encompasses several of the elements described below, whereby the use of all of the features is especially advantageous.

It is advantageous for the verification center as well as for the customer to have a signature card. Preferably, the verification center as well as the customer are in possession of software for reading digital watermarks and for optical character recognition (OCR) that is capable of converting documents that are present in paper form into text form.

Preferably, the verification center uses a graphic representation that symbolizes a confirmation of the authenticity. For example, this can be a graphic reproduction of the official seal of the verification center. Preferably, the graphic representation is designed in such a way that it can hold a sufficient amount of information in a digital watermark.

In order to ensure that the graphic representation of the symbol confirming the authenticity can hold a sufficient amount of information, preferably the most complex possible graphic representation is used. The capability of the graphic representation to hold a digital watermark is preferably checked during a prior approval process.

Figure 3:
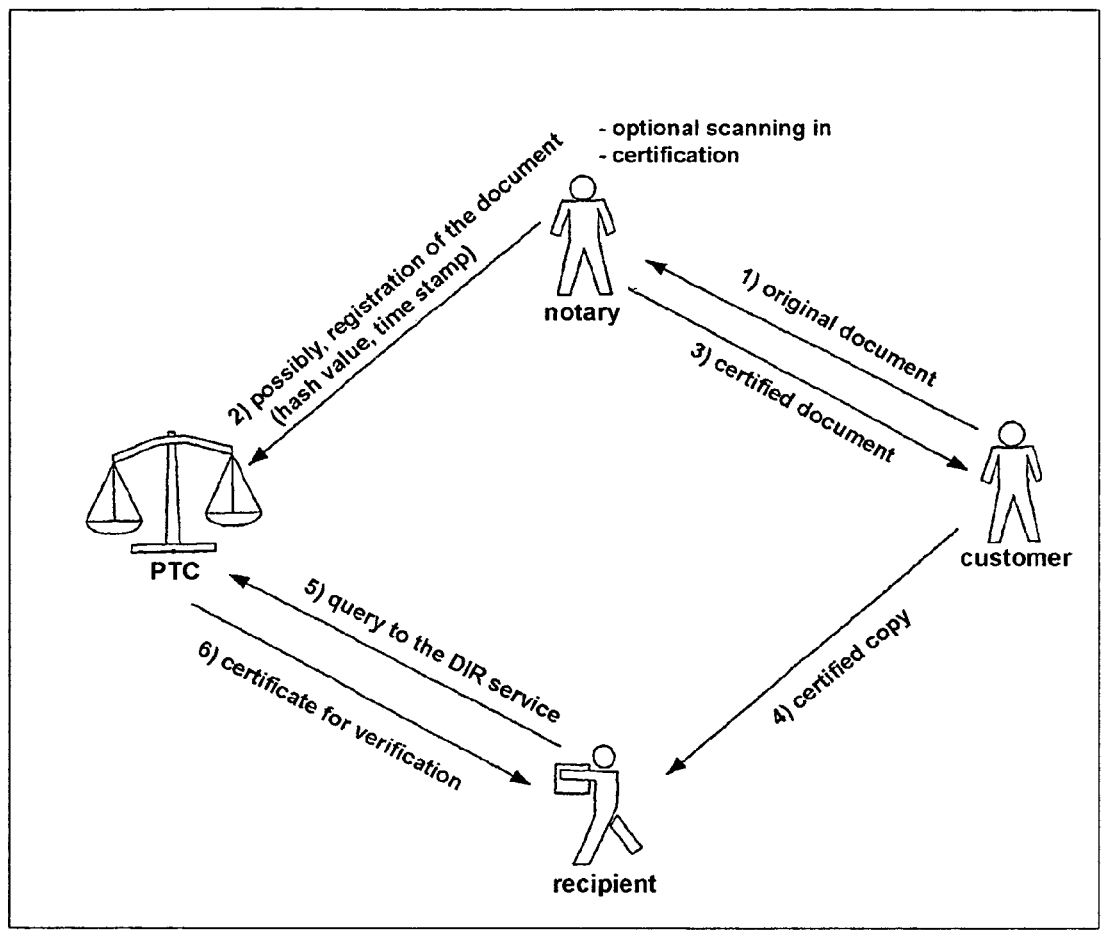
FIG. 3—a schematic diagram of a method according to the invention for the certification of documents.

FIG. 3 shows an overview of the process steps for certifying documents. Here, a notary functions as the verification center for certifying the authenticity of an original document. The document can be registered in a trust center PTC. Subsequently, the certified document can be transmitted to one or more recipients. Whether or not the document has been registered in the trust center PTC is checked by a query of the recipient to the trust center PTC.

Figure 4:
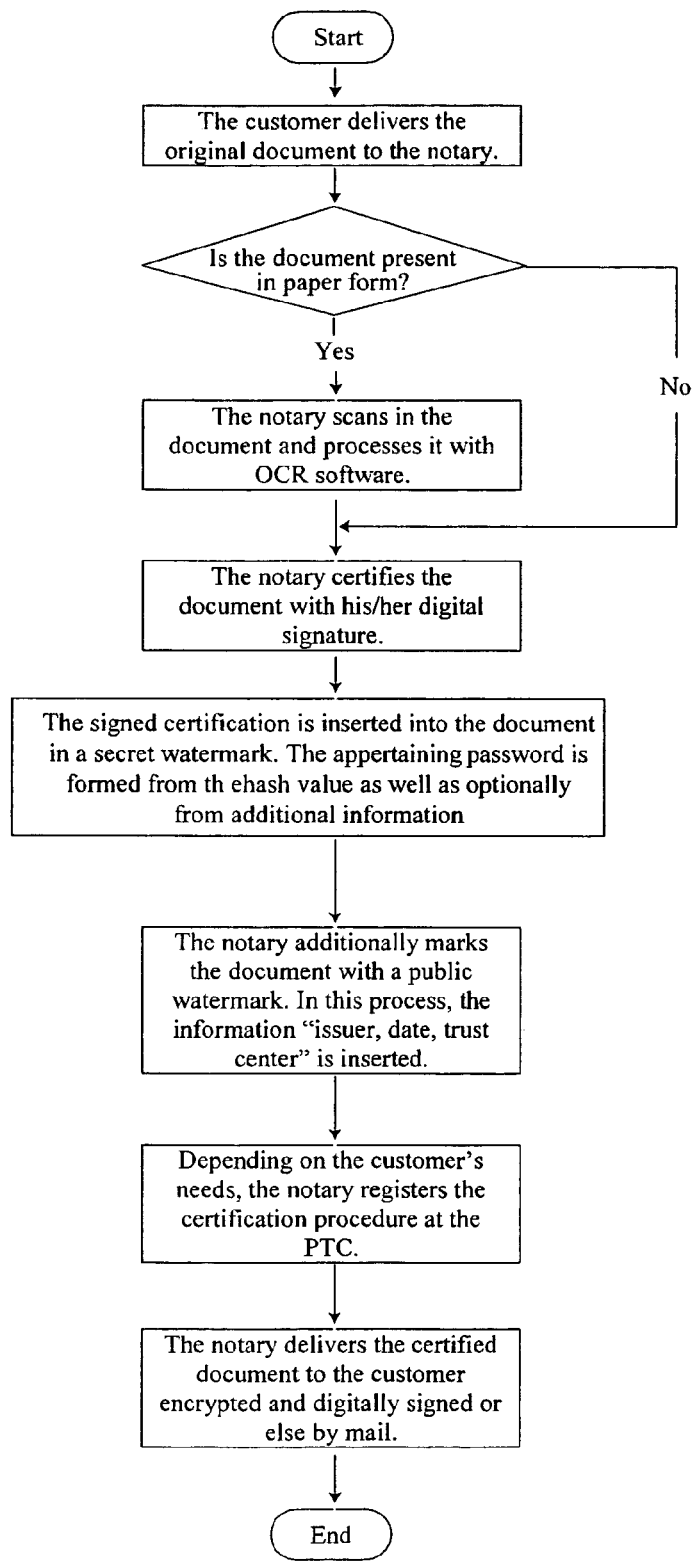
FIG. 4—a method for the certification of a document.

FIG. 4 shows a preferred method for certifying a document.

Figure 5:
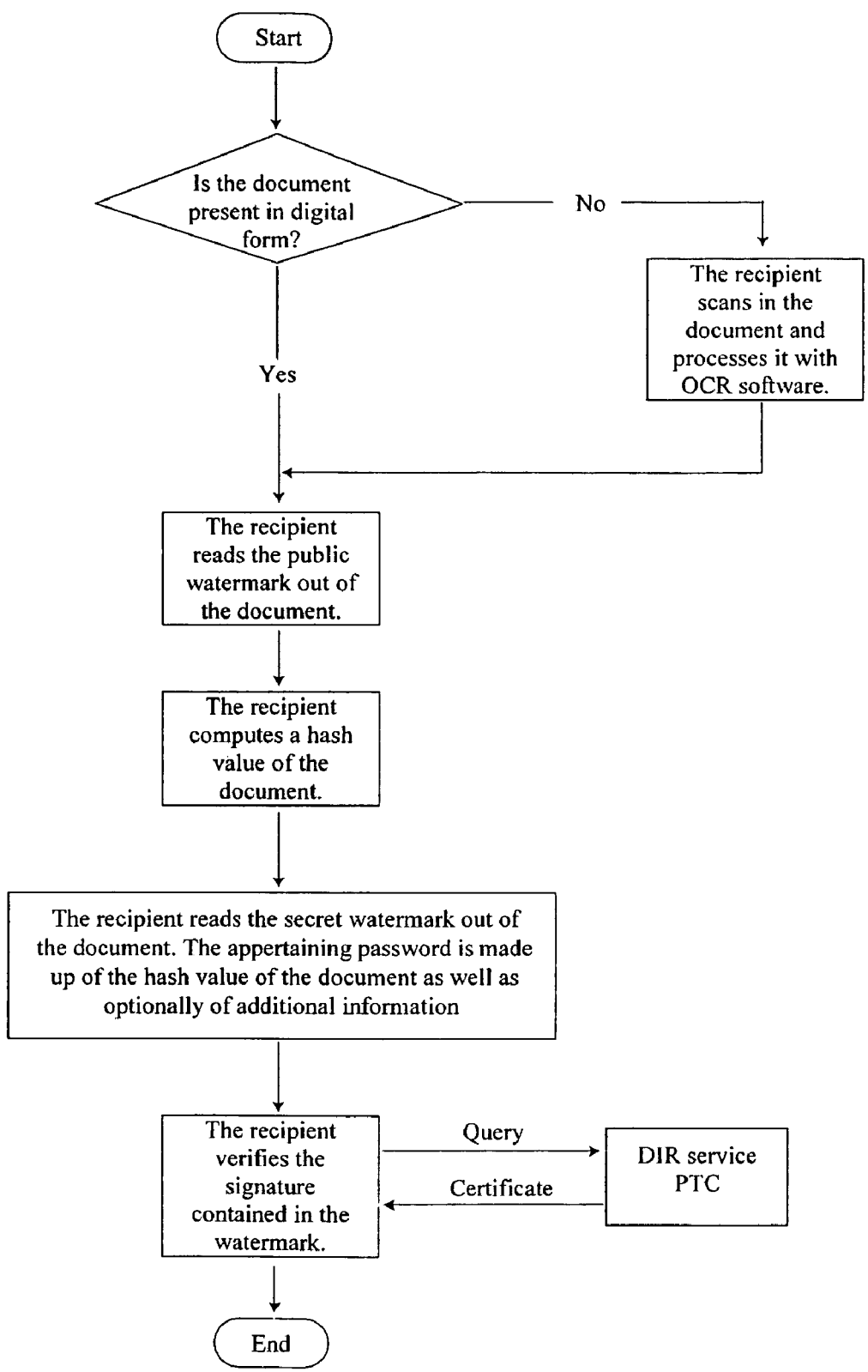
FIG. 5—a method for checking the authenticity of a certified document.

The reverse route for verifying a certified document is shown in FIG. 5 by way of an example. A preferred sequence of the confirmation of the authenticity of an original document starts at the customer, who requests the confirmation of the authenticity. The customer first delivers the original document to a verification center, for example, a notary. Depending on whether the document is present in paper or in digital form, the delivery is made in person, by mail or via e-mail. In case of delivery via e-mail, the electronic message has to be encrypted and digitally signed so as to ensure the integrity as well as the origin of the document. Moreover, in this case, the document should have a digital signature that confirms the authenticity and the integrity of the document (for example, the digital signature of the issuer, in the case of a certificate whose authenticity is to be confirmed).

If the document is present in paper form, the verification center should first scan in the document and convert it with OCR software into the appertaining ASCII text of the document so as to be able to confirm its authenticity. The authenticity of the document is then confirmed by digitally signing a defined phrase by the verification center. The graphic representation serves as the carrier of a secret digital watermark that holds the phrase and the appertaining digital signature as information. It is applied onto the document in invisible form, as a result of which the process of confirming the authenticity also receives a visual identification. Subsequently, the verification center can insert additional information, particularly information that does not need to be specially protected, into the public watermark. Examples of such information are the name of the verification center, the date of the confirmation of the authenticity and the name of the trust center involved.

With this, the confirmation of the authenticity is completed. Depending on the customer's needs, the possibility now exists for the certified document to be registered at the trust center. For this purpose, the verification center sends the hash value of the document to the trust center, where a time stamp is generated for the data. On the one hand, this optional registration constitutes additional evidence of the confirmation of the authentication procedure. On the other hand, the verification center can fulfill its archiving obligation by means of the registration.

Finally, the verification center provides the customer with the certified document in encrypted form and digitally signed. As an alternative, the document can also be delivered in person using a suitable data carrier.

The customer can now make and distribute any desired number of copies of the original document since it is present in digital form. The correspondence to the original can be proven for each copy, as the explanations below will demonstrate.

The invention prevents forged documents from being acknowledged as being genuine.

Of course, for the verification center that is confirming the authenticity, the possibility does exist to change a document before certifying it. For this reason, the customer has to be explicitly informed that he/she must examine any certified document before distributing it. Any changes made can be objected to at the verification center.

The preferred embodiments presented allow a flexible combination of digitally signed documents or certified copies, in digital as well as in analog (printed-out) form.

The method according to the invention, using a digital watermark to make a digital signature resistant to media discontinuities, is not limited to confirming the authenticity of documents. The principle can also be used, for example, if a document producer issues large numbers of documents whose authenticity has to be confirmed by a signature. Examples of this are educational certificates, employment certificates, tax assessments, bank account statements or birth certificates.

In these scenarios, the document producer can confirm the authenticity of the documents by means of a digital signature that even withstands media discontinuities since it is embedded in a digital watermark. The documents can thus be printed out and later scanned in for purposes of verification and transformed by means of OCR software into an ASCII version. This approach has the advantage over traditional methods that, in addition to the authenticity, it is also possible to verify the integrity of the documents issued.

Figure 6:
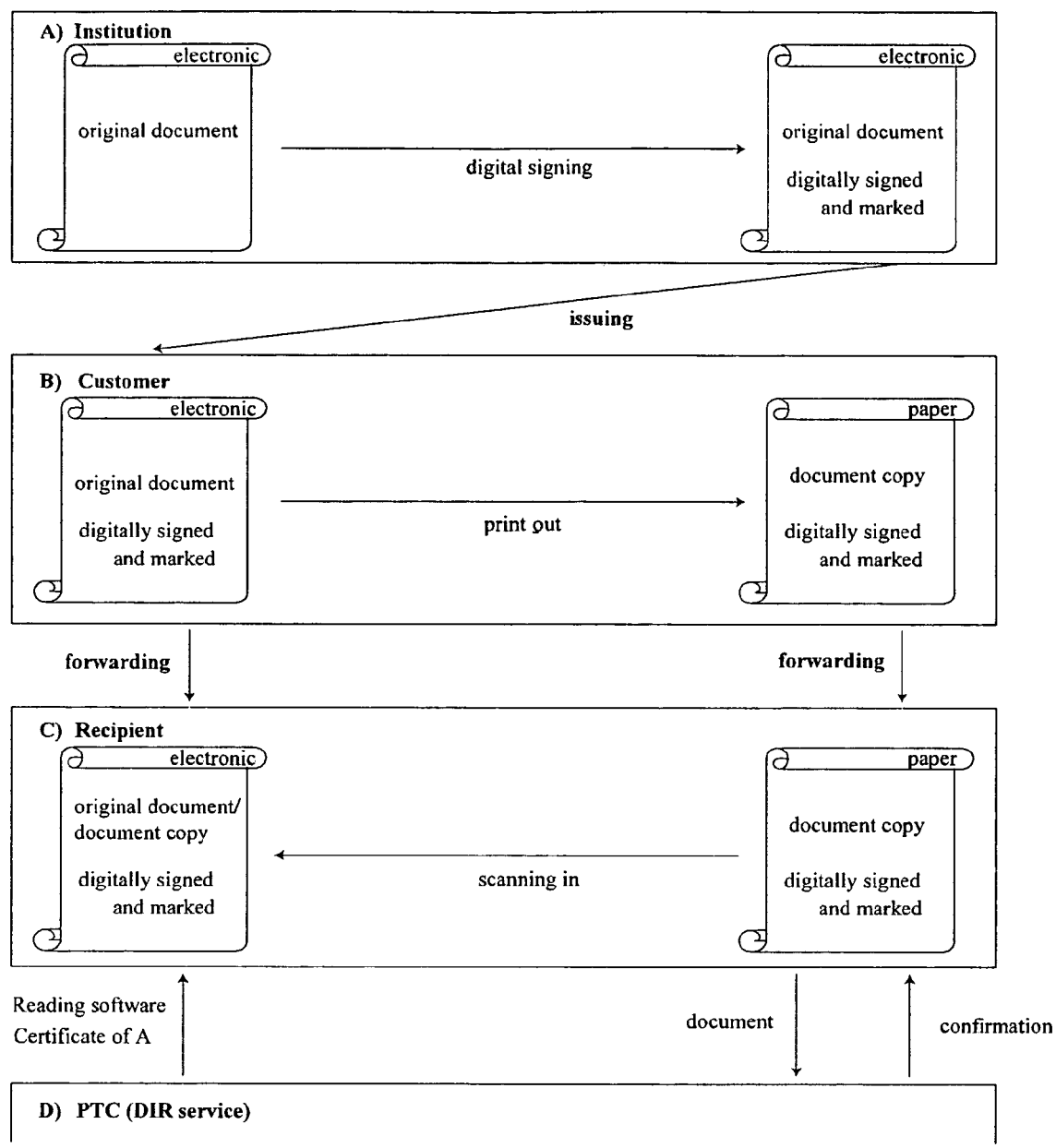
FIG. 6—the use of a method according to the invention for mass-producing documents.

A preferred method for issuing multiple documents, especially for copying documents and for mass-producing documents, will be described below with reference to FIG. 6.

A document issuer A prepares the original of a document, provides it with a digital signature and marks this document with a watermark.

The issued electronic document is transmitted to a customer B who immediately forwards the electronic document to a recipient C and/or prints out the document and forwards the paper document.

The recipient C receives the electronic document, a copy of the electronic document or a copy of the paper document. All of the originals or copies are digitally signed and marked so that the individual copies also fulfill the function of originals.

In order to increase the data security, it is advantageous for a trust center D to perform a check. In the case described here, the trust center provides the recipient C with software to read the certificate generated by A. Moreover, the trust center D confirms the authenticity of one or more of the transmitted documents.

The digital signature of the issuing institution is inserted into the document via the secret watermark. In addition, a visible graphic representation of the issuer is applied onto the document which especially contains the name of the issuer. Further data (for instance, the date of issue, the trust center) can be written into the document by using an public watermark.

The invention can also be used to create an electronic safe which will be referred to hereinafter as an e-safe.

The e-safe, which can additionally be configured as an "m-safe" (mobile safe) by incorporating mobile user units such as mobile phone devices or digital assistants, is an electronic safe for various digital documents such as invoices, bank account statements, receipts, contracts, etc.

Through the encryption and digital signing of the contents, this electronic archive makes it possible to create legally binding documentation that can be reconstructed at any time. The customer organizes his/her e-safe via an Internet, telephone, fax or cellular access point and stores his/her important documents (directly or indirectly, for example, after a scanning operation) in a self-defined hierarchical directory structure.

The worldwide and thus location-independent access to the e-safe is likewise effectuated via one of the abovementioned communication channels. In this context, special digital papers, sometimes referred to as "emergency documents", can be retrieved worldwide by fax free of charge. Thus, among other things, negotiations with foreign customers if papers are lost (identity cards, passports) or if there is a need to view documents such as, for example, vaccination booklets, are considerably simplified. Further applications of the e-safe comprise reminder functions (for example, via SMS) as well as the creation of a "world post office box."

The integration of digital signatures and the embedding of the digital signature as a watermark that survives media discontinuities allow the establishment of reliable electronic safes.

An example of a holistic e-safe concept is the integration of services of the e-government and other institutions such as banks, insurance companies, telecommunication providers, etc. They receive exclusive write access to the electronic archive where they can directly store certificates, confirmations of authenticity, invoices, insurance policies, etc.

In the representation of the preferred embodiments, the term "hash value" is used as a short form for "secure hash". The term "secure hash" especially means the issuing of a one-way function.

An especially advantageous refinement of the invention comprises the integration of a time stamp. The integration of the time stamp, which is preferably provided by a trust center, provides proof of the authorship of the document since it is evident who was the first to provide a given document with a digital signature.

As an instrument of copyright protection, a robust digital watermark is a suitable means for identifying documents. The two properties, namely, robustness and imperceptibility, are of central importance.

Moreover, the application of trusted digital watermarking contributes to securing the integrity of the document content as well as the identity of the issuer. This variant of the invention, like the other variants of the invention, can be realized with hard-wired circuits as well as through suitable software routines.

Another application of this technology is the protection of documents that contain highly sensitive information. Thus, for example, the possibility exists to mark the documents in question with a secret watermark or else additionally with a public watermark.

The embodiments of the invention presented here are especially advantageous. The person skilled in the art derives from the examples presented the stimulus to use the mechanisms correspondingly in other applications as well so as to increase the security and to check security features.

The invention claimed is:

1. A method of authenticating a document, the method comprising the steps of:
    making a digital signature with a secret key, the digital signature belonging to a person who is authorized to authenticate the document and the digital signature being usable by a trust center to confirm that the document has been authenticated;
    making secret digital watermark in the document whose message includes the digital signature; and
    marking the document with a public watermark that carries additional information about the authentication.

2. The method according to claim 1, comprising storing the secret digital watermark in a separate file.

3. The method according to claim 2, comprising transmitting the file and/or the document to the trust center.

4. The method according to claim 3, comprising checking by the trust center whether the digital signature belongs to the person who is authorized to authenticate documents.

5. The method according to claim 4, comprising performing a checking procedure to ascertain whether particulars of the person are stored in a separate list.

6. The method according to claim 4, comprising issuing by the trust center of a confirmation that the person is authorized to authenticate documents.

7. The method according to claim 6, wherein the step of making the secret digital watermark is performed by the trust center, the trust center thereby confirming that the person is authorized to authenticate documents.

8. The method according to claim 1 wherein:
the secret digital watermark is made in the public watermark.

9. The method according to claim 1, wherein the secret digital watermark contains metainformation.

10. The method according to claim 1 further comprising the step of:
adding a graphic symbol to the document in which the public watermark is embedded, the graphic symbol thereby visually indicating that the document's authentication is confirmable by the trust center.

11. The method according to claim 10, comprising, before additionally marking the document with the public watermark, performing a checking procedure to ascertain whether the graphic symbol can hold a sufficient amount of security information.

12. The method according to claim 1, comprising recording a point in time at which the method is performed.

13. The method according to claim 12, comprising inserting the recorded point in time into the secret digital watermark.

14. The method according to claim 12 comprising recording the point in time by a digital time stamp.

15. The method according to claim 14, comprising recording the digital time stamp in a trust center.

16. The method according to claim 1, comprising storing the document whose authenticity has been confirmed in a database.

17. The method according to claim 16, wherein the trust center encompasses the database.

18. The method according to claim 1, comprising carrying out the method for confirming the authenticity of the document at different security levels.

19. The method according to claim 18, wherein higher security levels can be achieved through a higher number of verification elements.

20. The method according to claim 19, comprising using different granularities of the verification elements.

21. The method according to claim 1 wherein the message further includes information for which a digest is included in the message.

22. An electronic document processed by means of a method according to claim 1.

23. The method according to claim 1 wherein a secret key for reading the secret digital watermark is made using information that is characteristic of the document.

24. The method according to claim 23, wherein the information that is characteristic of the document contains a hash value.

* * * * *